Patented Aug. 3, 1926.

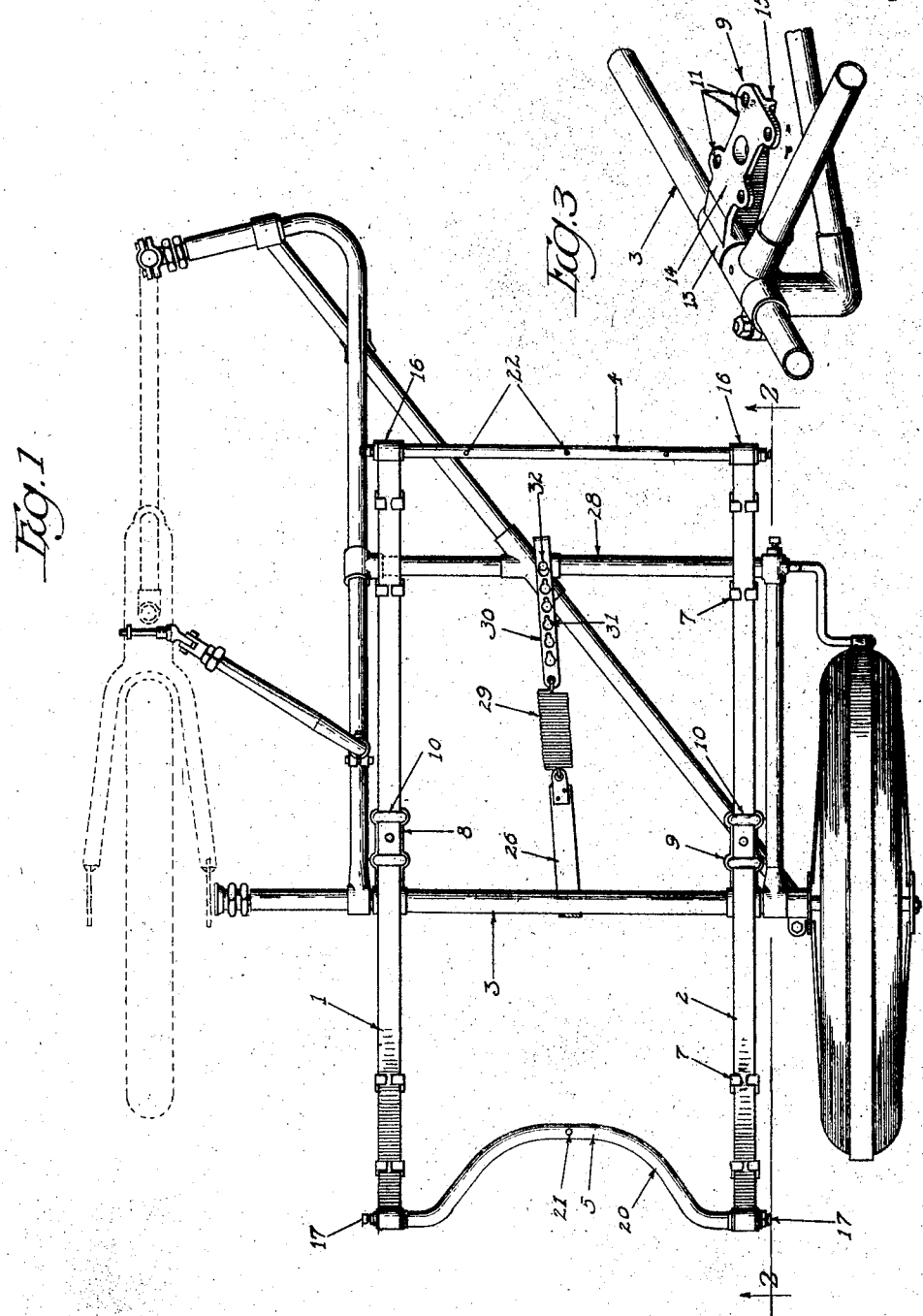

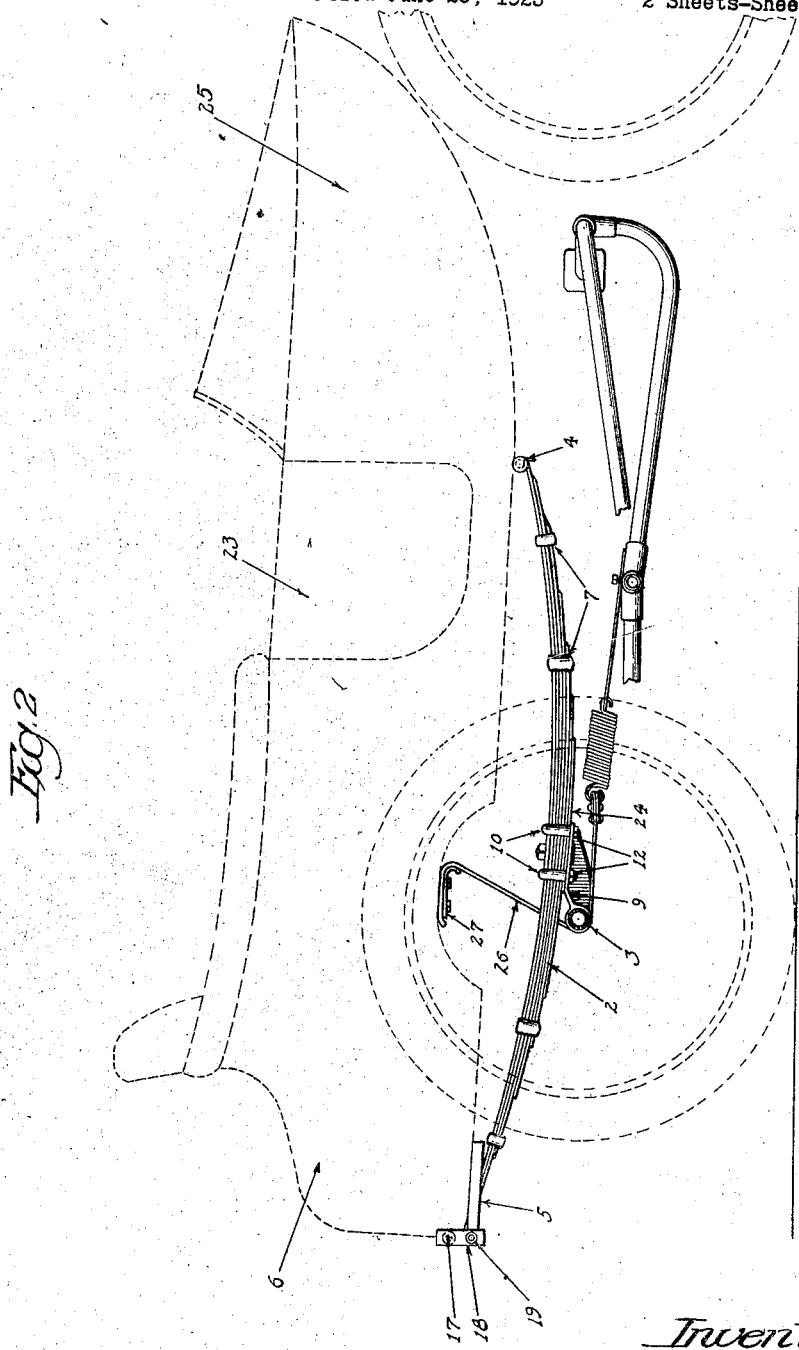

1,594,615

UNITED STATES PATENT OFFICE.

WILLIAM S. HARLEY AND ARTHUR R. CONSTANTINE, OF MILWAUKEE, WISCONSIN, ASSIGNORS TO HARLEY-DAVIDSON MOTOR COMPANY, OF MILWAUKEE, WISCONSIN, A CORPORATION OF WISCONSIN.

SPRING SUSPENSION FOR VEHICLES.

Application filed June 29, 1923. Serial No. 648,504.

This invention relates to a spring suspension for vehicle bodies.

It is particularly adapted for supporting motorcycle side cars but may be used for supporting the bodies of other vehicles.

Heretofore, in motorcycle side car construction, it has been the practice to employ two distinct sets of springs for the front and rear of the side car body. These springs were mounted on the side car frame near the front and rear thereof and were of necessity comparatively short.

The action of the side car body when so supported was such that the forward end of the car body responded to the irregularities to which the front wheel of the motorcycle was subjected and the rear of the car body responded to irregularities to which the rear wheels were subjected, resulting in pitching and irregular motion of the body.

Expressed in other language, side car mountings as heretofore provided have been open to the objection that vibrations communicated to the wheels have had only a relatively short path to the body of the side car, and, furthermore, have had a path through which said vibrations were communicated with such directness that the cushioning effects of the springs have left much to be desired.

It is an object of the present invention to provide a mounting means for a side car in which shocks communicated to the wheels must travel through a relatively long spring path before being communicated to the body of the side car, which spring path, moreover, is so disposed relative to the wheels of the motorcycle and to the body of the side car that said shocks are communicated only very indirectly.

A further object is to provide a spring suport for a side car which is separated at a point closely adjacent to the rear axle of the motorcycle, whereby shocks communicated to the axle will be substantially ineffective in communicating vibration to the side car in a forward or rearward direction and which will effectually cut down communication of such shocks in a vertical direction.

A further object is to provide a spring mounting for a motorcycle side car which will cause such delay in the communication of shocks from the wheels to the side car that said shocks will be effectually smoothed out before reaching said side car.

A further object of this invention is to provide an improved spring suspension which will substantially eliminate pitching of the vehicle body.

Another object is to provide a spring suspension for vehicle bodies of simplified construction.

Another object is to provide a spring support for vehicle bodies of increased effectiveness for absorbing the shocks incident to travel.

Another object is to provide a spring support for a vehicle body which will enable the use of realtively long springs.

Another object is to provide means for dampening the vibrations of the supporting springs.

Other objects and advantages will hereinafter appear.

In accordance with this invention as preferably embodied, the vehicle body is supported by a single pair leaf springs supported adjacent the rear axle of the vehicle.

In order to more fully explain the invention and a way in which it may be embodied, the accompanying drawings will be described.

Fig. 1 is a plan of a motorcycle side car frame and spring suspension with the side car removed.

Fig. 2 is an elevation of the motorcycle side car frame and spring support, and

Fig. 3 is a perspective view of the spring seat.

The spring support comprises in general a pair of semi-elliptical springs 1 and 2, carried by the rear axle 3 of the motorcycle side car frame and connected at their forward and rear ends by cross bars 4 and 5 to which the side car body 6 is attached.

Each spring has a plurality of leaves secured together by spring clips 7 and mounted at their center on spring seats 8 and 9, carried by the rear axle 3 of the side car frame.

U-bolts 10 pass over the springs and through suitable openings 11 in the spring seats and have nuts 12 threaded on the lower ends thereof to secure the springs to the spring seats.

Each spring seat comprises a hub 13, the supporting surface 14 and a reinforcing rib 15. The hub 13 passes over the rear axle and is brazed thereto, making the seat substantially integral with the axle.

Of course, if desired, other forms of spring seats may be used.

In the embodiment illustrated, the supporting surface 14 extends forward of the rear axle to bring the center of the spring more nearly under the center of gravity of the load and to permit the use of relatively long springs. The location of the spring seat, however, may be varied to suit vehicle bodies and supporting frames of different designs.

The forward ends of the springs are provided with shackles 16 which pass around the ends of the cross bar 4.

The rear ends of the springs are secured to shackle bolts 17 carrying links 18 in which the ends 19 of the rear cross bar 5 are carried.

The rear cross rod 5 is bent forwardly at 20 to pass under the rear of the side car body and has bolt opening 21 therethrough for securing the side car body thereto.

The forward end of the car body is bolted to the forward cross bar 4, bolt openings 22 being provided for the purpose.

When a passenger enters or leaves the side car through the door 23, the entire weight of the passenger is supported by the forward end of the spring.

The forward end of the spring is, therefore, provided with an extra leaf 24 to increase the strength thereof. This leaf 24 also aids in supporting the forwardly extending end 25 of the side car body.

In order to dampen the action of the springs 1 and 2, and prevent the side car body from jouncing or vibrating up and down too violently, a check strap 26 is provided.

Strap 26, fastened to the under side of the car body by a clamping plate 27, passes partially around the rear axle 3 and is connected to the front bar 28 of the side car frame through a helical spring 29 and an adjustable member 30.

A relatively large surface of frictional engagement of the strap with the axle is provided to create a snubbing action.

Spring 29 insures that the strap 26 will be retained in engagement with the axle 3 at all times.

The strap member 30 is provided with a plurality of openings 31 for engagement with the pin 32 carried by the frame member 28, whereby the tension of the spring 29 may be varied.

It will be noted that the body is supported practically independently of the front wheel of the motorcycle.

When the motorcycle passes over an irregularity in the surface of the road, the front wheel of the machine follows the irregularity. This movement of the front wheel merely causes a slight twisting movement of the rear axle. The movement is very slight, however, and is readily absorbed by the long springs 1 and 2, so that there is practically no tilting of the car body in response thereto.

When the rear wheel strikes the obstruction or depression, there is no twisting of the rear axle and the movement of the body in response to the movement of the rear axle is substantially entirely vertical or normal to the surface of the road. The springs 1 and 2, due to their length and low period of vibration, absorb a large portion of the shock in transmitting the motion to the side car body, and the check strap 26 snubbing around the axle 3 prevents undue jouncing of the body.

Thus, as the motorcycle travels over the uneven surface of the road, the side car body remains substantially parallel to the surface of the road, having slight vertical movement in response to the irregularities over which the rear wheels pass but having no pitching motion in response to the irregular movement of the front wheel.

Expressed in other language, the functions of the improved construction above described may be outlined as follows. Each leaf spring 2, it will be noted, is relatively long compared to the wheel base of the motorcycle. Moreover, each of said leaf springs 2 is relatively flat. Each leaf spring 2 is supported at a single point substantially midway of its length. It will be obvious, of course, that in a construction which is not effectually cushioned shocks in a vertical direction communicated to the front wheel will result in a pitching action of the side car, producing a very uncomfortable oscillating action of the back rest of said side car. In prior constructions this oscillating effect has been very annoying to a passenger in the side car. According to the present invention, shocks in a vertical direction communicated to the front wheel of the motorcycle must be transmitted by way of the axle 3. By reason of the fact that the spring 2 is relatively long, the effects of said shocks are very materially smoothed out before said shocks are communicated to the side car. The time element is important in this consideration, inasmuch as the delay in communicating shocks from the front wheel to the side car results in the effectual smoothing out of said shocks. Moreover, due to the relative flatness of the spring 2, which flatness is made possible by the length of said spring, shocks transmitted through the front wheel of the motorcycle are communicated in a direction substantially transverse to the length of said spring 2, whereby said shocks are communicated only very indirectly to the body of the motorcycle.

Referring now to shocks communicated to the rear wheel of the motorcycle, it will be noted that such shocks are communicated to the leaf springs 2—2 substantially midway of their length. As explained above in connection with shocks communicated from the front wheel, said shocks have a relatively long path before being communicated to the side car and are communicated in a direction substantially transverse to the length of said springs, whereby said shocks are communicated only very indirectly. The present construction involves substantially no oscillation of the back rest of the side car, which, as referred to above, has been so annoying in prior constructions.

Of course, this invention is susceptible of other adaptations and modifications.

What is claimed is:—

1. In a motorcycle, in combination, the front and rear wheels of said motorcycle, the body of said motorcycle, and leaf springs for supporting said body, said leaf springs comprising relatively flat members which are relatively long compared to the wheel base of said motorcycle, said leaf springs being supported substantially midway of their length solely from the rear axle of said motorcycle and having their ends connected to said side car and forming the sole support therefor.

2. In motorcycle side car supporting means, a rear axle, relatively long leaf springs disposed transversely of said axle and supported solely by said axle, the region of such support being substantially midway of the length of said leaf springs, the extremities of said leaf springs forming connecting means for supporting a motorcycle side car.

3. In motorcycle side car supporting means, a rear axle, relatively long leaf springs disposed transversely of said axle and supported solely by said axle, the region of such support being substantially midway of the length of said leaf springs, the extremities of said leaf springs forming connecting means for supporting a motorcycle side car, each of said leaf springs having its forward portion of greater strength than the rear portion thereof.

4. In combination, the rear axle of a motorcycle, a side car and spring supporting means for said side car, said supporting means comprising longitudinally extending leaf springs disposed transversely to said rear axle, said leaf springs having their sole support substantially midway of their length upon said rear axle.

5. A spring support for a motorcycle side car body comprising a pair of semi-elliptical springs mounted adjacent the rear axle of the motorcycle side car frame and forming the sole support for said body, and means for dampening the vibration of said body.

6. Shock absorbing means for a motorcycle side car body comprising a pair of relatively long leaf springs forming the sole support for said body, and snubbing means for dampening the vibration of said body.

7. The combination with a motorcycle, of a side car frame, a side car body, and snubbing means attached to said body and passing around one of the members of said frame to prevent excessive vibration of said body.

8. The combination with a motorcycle, of a side car frame, a side car body, snubbing means attached to said body and passing around one of the members of said frame to prevent excessive vibration of said body, and resilient means for maintaining said snubbing means in engagement with said member.

9. In combination, a car body, a frame therefor, said frame comprising an axle and a pair of springs secured thereto, said car body being supported by said springs, and a strap secured to said car body and arranged for cooperation with said frame to dampen the vibrations of said springs.

10. In combination, a car body, a frame therefor, said frame comprising an axle and a pair of springs secured thereto, said car body being supported by said springs, a strap secured to said car body and arranged for cooperation with said frame to dampen the vibrations of said springs, and means to vary the effect of said strap.

11. In combination, a car body, a frame therefor, said frame comprising an axle and a pair of semi-elliptical springs secured thereto, said car body being supported by said springs, and a strap secured to said car body and cooperating with said axle to dampen the vibrations of said springs.

WILLIAM S. HARLEY.
ARTHUR R. CONSTANTINE.